(12) United States Patent
Yamamoto et al.

(10) Patent No.: US 8,338,519 B2
(45) Date of Patent: Dec. 25, 2012

(54) PTFE RESIN COMPOSITION

(75) Inventors: Kazuhiro Yamamoto, Nihonmatsu (JP); Shinya Nakaoka, Fujisawa (JP); Takaaki Yasudomi, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 490 days.

(21) Appl. No.: 12/083,558

(22) PCT Filed: Oct. 12, 2006

(86) PCT No.: PCT/JP2006/320407
§ 371 (c)(1),
(2), (4) Date: Apr. 14, 2008

(87) PCT Pub. No.: WO2007/043622
PCT Pub. Date: Apr. 19, 2007

(65) Prior Publication Data
US 2009/0230629 A1 Sep. 17, 2009

(30) Foreign Application Priority Data

Oct. 12, 2005 (JP) .................................. 2005-297419

(51) Int. Cl.
*C08K 3/14* (2006.01)
(52) U.S. Cl. ........ 524/406; 524/424; 524/443; 524/495; 524/496; 524/544; 524/546
(58) Field of Classification Search .................. 524/406, 524/413, 424, 546
See application file for complete search history.

(56) References Cited

U.S. PATENT DOCUMENTS

| 4,655,944 | A | * | 4/1987 | Mori | 428/545 |
| 4,703,076 | A | * | 10/1987 | Mori | 524/420 |
| 5,399,142 | A | * | 3/1995 | Fukunaga | 492/59 |
| 6,607,820 | B2 | * | 8/2003 | Niwa et al. | 428/323 |
| 2008/0090046 | A1 | * | 4/2008 | Ensinger et al. | 428/66.4 |

FOREIGN PATENT DOCUMENTS

| JP | 55018477 A | * | 2/1980 |
| JP | 07-247396 | | 9/1995 |
| JP | 08-253600 | | 10/1996 |
| JP | 09-132691 | | 5/1997 |
| JP | 2001-278997 | | 10/2001 |
| JP | 2001-304420 | | 10/2001 |
| JP | 2001-355634 | | 12/2001 |
| JP | 2002-317089 | | 10/2002 |
| WO | WO 2006066837 A1 | * | 6/2006 |

OTHER PUBLICATIONS

Machine translation of JP 2001-355634 A, retrieved on Jul. 9, 2010.*
Machine translation of JP 2001-278997 A, translated on Sep. 24, 2010.*
Machine translation of JP 08-253600 A, translated on Sep. 24, 2010.*
Mineral Hardness Chart, CiDRQ(R) Precision Services, LLC, 2008.*
Derwent Abstract of Washida, JP 55-018477 A.*
Plastic Material Data Sheets, 2004, Matweb-Division of Automation Creation, Inc.*
Yaw's Thermophysical Properties of Chemicals and Hydrocarbons, 2010, Knovel.*
"Physical and Chemical Properties", Handbook of Fillers, 2010, Chem. Tec. 3rd edition.*
Translation of JP 55018477A, Mar. 2012.*

* cited by examiner

*Primary Examiner* — Nicole M Buie-Hatcher
(74) *Attorney, Agent, or Firm* — Brinks Hofer Gilson & Lione

(57) ABSTRACT

A PTFE resin composition, which comprises PTFE resin, and metal carbide powder having a Vickers hardness of 1,200 HV, or more, and which preferably further contains an inorganic filler other than the metal carbide powder, for example, carbon fibers, glass fibers, etc., has an improved abrasion resistance, when molded into resin seal rings, etc., by reducing a self-abrasion amount of the resin against hard mating metals having a rough surface (Rz of about 6.3 to about 9.0 according to JIS B0601-1994), and by polishing the mating material roughness rapidly.

5 Claims, No Drawings

PTFE RESIN COMPOSITION

RELATED APPLICATIONS

The present application is a 35 U.S.C. §371 national stage filing of International Patent Application No. PCT/JP2006/320407, filed Oct. 12, 2006, to which priority is claimed under 35 U.S.C. §120 and through which priority is claimed under 35 U.S.C. §119 to Japanese Priority Patent Application No. 2005-297419; filed Oct. 12, 2005.

TECHNICAL FIELD

The present invention relates to a PTFE resin composition, and more particularly to a PTFE resin composition for use as suitable molding materials for seal rings with reduced self-abrasion property, etc.

BACKGROUND ART

Resin seal rings are now mass produced on the assumption that they are used in a sliding contact with polished surfaces, irrespective of qualities of mating housing materials. Various improvements of polished surfaces have been so far made to enhance the self-abrasion property of seal rings.

Patent Literature 1: JP-A-2002-317089

However, the users are now endeavoring to eliminate the polishing work of the mating housing materials to reduce the cost. Resin seal rings, on the other hand, are softer by nature than mating housing materials such as metals, particularly hardened metals obtained by quenching, etc., and thus are highly susceptible to abrasion, so that loss of seal ring function can be highly anticipated as a serious problem.

DISCLOSURE OF THE INVENTION

Problem to be Solved by the Invention

An object of the present invention is to provide a PTFE resin composition having an improved abrasion resistance, when molded into resin seal rings, etc. by reducing self-abrasion property of the resin against hard mating metals having a surface roughness (Rz: about 6.3 to about 9.0 according to JIS B0601-1994) and by polishing the mating metals rapidly to a desirable surface roughness.

Means for Solving the Problem

The object of the present invention can be attained by a PTFE resin composition, which comprises a PTFE resin, and metal carbide powder having a Vickers hardness of 1,200HV, or more. The PTFE resin composition preferably further contains other inorganic fillers than the metal carbide, such as carbon fibers, glass fibers, etc.

EFFECT OF THE INVENTION

Filling of metal carbide powder having a high hardness into PTFE resin can give a function of polishing the sliding surfaces of mating housing materials to the sliding part, and repetition of such sliding can smoothen the roughness of the surfaces of mating housing materials, thereby reducing contact surface pressure and consequently reducing the self-abrasion and improving the abrasion resistance of the resin seal rings. Such effects will be more remarkable with increasing sliding time. In other words, the resin seal rings can be applied to mating materials having a high surface roughness, resulting in reduction in the processing cost of the surfaces of mating metals.

The present PTFE resin composition having such effects can be effectively used in the field of rings that can seal hard mating housing materials having a high surface roughness, particularly as a molding material for automatic transmission seal rings, etc.

BEST MODES FOR CARRYING OUT THE INVENTION

PTFE resin for use in the present invention includes, for example, homopolymer of tetrafluoroethylene, and copolymers thereof with not more than 2% by weight of a copolymerizable monomer, such as perfluoro(alkyl vinyl ether), hexafluoropropene, etc., which have fluoroalkyl groups even on side chains. Furthermore, copolymers of tetrafluoroethylene with ethylene can be used. PTFE resin can be mainly classified into three groups, i.e. molding powder, fine powder, and dispersion for impregnation or coating. In the present invention, preferably molding powder having an average particle size of particularly about several ten to about several hundred μm is used. Practically, commercially available products such as Teflon (trade mark) 7-J and 7F-J (products of Mitsui-DuPont Fluorochemical Co., Ltd.), G163 and G195 (products of Asahi Glass Co., Ltd.), M-12 and M-18F (products of Daikin Industries, Ltd.), etc. can be used as such.

Metal carbide powder for use together with PTFE resin has a Vickers hardness of 1,200HV or more (as determined by a Vickers hardness tester according to JIS Z2244) and an average particle size of about 0.1 to about 30 μm, preferably about 1 to about 20 μm. WC (tungsten carbide) has such characteristics as a very high hardness at the ordinary temperature over to elevated temperatures, a high abrasion resistance, a chemical inertness, a good corrosion resistance, etc., and WC having a Vickers hardness of 1,200HV or more can be used. SiC (silicon carbide) having a Vickers hardness of 2,300HV or more is preferably used, and SiC has distinguished abrasion resistance and corrosion resistance. TiC (titanium carbide) is the hardest, and TiC having a Vickers hardness of 2,800HV, or more can be used preferably as one of materials having the most distinguished abrasion resistance.

Metal carbide powder, preferably WC powder and TiC powder, having an average particle size of about 0.4 to about 10 μm, preferably about 0.9 to about 10 μm, can be used. SiC powder having an average particle size of about 0.5 to about 10 μm, preferably about 0.7 to about 10 μm, can be also used. The average particle size of metal carbide powder as used herein gives a large influence on the self-abrasion amount of molded articles of metal carbide powder-containing PTFE resin, and a larger average particle size in the above-mentioned ranges has a tendency to lower the self-abrasion amount and also a specific abrasion amount derived from the abrasion amount. Optimum proportion of metal carbide to be admixed also depends on average particle size.

The metal carbide powder can be used in a proportion of about 0.1 to about 30% by volume, preferably about 1 to about 20% by volume, on the basis of sum total of PTFE resin and metal carbide powder. Preferable range of the proportion of the metal carbide powder depends on metal carbide species and average particle sizes. For WC, the preferable range is about 1 to about 10% by volume, more preferably about 1 to about 8% by volume. For SiC, it is about 1 to about 30% by volume, more preferably about 1 to about 20% by volume. For TiC, it is about 0.5 to about 30% by volume, more preferably about 1 to about 10% by volume. When the proportions are below about 1% by volume, such an object of the present invention as lowering of self-abrasion amount cannot be attained, whereas when the proportions are above the above-mentioned respective upper limit values, the metal carbide powder will attack the mating metal excessively, resulting in accelerated abrasion of the mating metal.

The PTFE resin composition comprising the foregoing two components can further contain other inorganic fillers than the metal carbide, such as carbon fibers, glass fibers, copper powder, aluminum powder, whiskers, graphite powder, coke powder, etc. The inorganic filler, preferably fibrous fillers such as carbon fibers, glass fibers, etc. can be added in a proportion of about 30% by volume or less, preferably about 1 to about 28% by volume, on the basis of sum total of PTFE resin, metal carbide powder, and the inorganic filler. Addition of the inorganic filler, preferably fibrous filler, can considerably reduce the self-abrasion amount, even if the proportion of metal carbide powder is reduced to about 0.5 to about 10% by volume. The metal carbide powder is expensive, so a decrease in the proportion can lead to cost reduction, and the metal carbide powder has a high specific gravity, and an increase in the proportion of the metal carbide powder to be admixed will make granulation rather difficult. Thus, a decrease in the admixing proportion of the metal carbide powder can make the handling easier.

The carbon fibers for use in the present invention include, for example, pitch-based ones, rayon-based ones, polyacrylonitrile-based one, etc., and those having fiber diameters of about 1 to about 50 μm, preferably about 7 to about 15 μm, and average fiber lengths of about 10-1,000 μm, preferably about 50 to about 200 μm, can be used. Glass fibers having an average fiber diameter of about 1 to about 50 μm, preferably about 7 to about 15 μm, and an average fiber length of about 10 to about 1,000 μm, preferably about 50 to about 200 μm, can be used. It is preferable to use the inorganic filler after surface treatment with a silane coupling agent, etc. in advance. An amount in % by volume of the fibrous filler can be calculated from the specific gravity, in the same manner as in the case of PTFE resin or metal carbide powder.

Molding of the PTFE resin composition comprising the afore-mentioned components can be carried out by mixing the respective components in a mixer such as a Henschel mixer, a universal mixer, etc., and then maintaining the mixture under molding pressure of about 10 to about 20 MPa for about 1.5 to about 3 minutes to make preliminary molding articles in a rod shape, etc., followed by calcining at about 360° to about 380° C. for about 2 to about 3 hours. By processing the calcined molding articles, articles in a desired shape, for example, seal rings, can be obtained.

EXAMPLES

The present invention will be described in detail below, referring to Examples.

Examples 1-20

Mixtures of PTFE resin with WC, SiC or TiC were molded by the afore-mentioned molding procedure, and then the moldings were processed into rectangular parallelepiped with a sliding face of 3 mm×3 mm (sliding area of 9 mm$^3$) and a height of 5 mm, which were subjected to reciprocating motion friction abrasion tests using a reciprocating motion friction abrasion tester to determine abrasion amount, while reciprocatively moving the test pieces under a constant load and at a constant temperature under the following conditions:

Surface pressure: 3.3MPa
Sliding speed: 6.6 mm/sec.
Sliding distance: 23 mm
Number of reciprocation: 2,000 (total sliding distance 92 m)
Temperature: 150° C.
Lubricating oil: CVTF (Toyota pure CVT fluid TC)
Mating material: Niteided SCM420 (Rz 6.3 target)

Results of determination of self-abrasion amount [reduction in weight by abrasion: (a difference ΔT in thickness before and after the sliding test)×(sliding area)×(specific gravity)] are given in terms of specific abrasion amount in the following Table 1 together with amounts in % by volume of one constituent component of test pieces (the balance being PTFE resin in % by volume).

PTFE resin: Teflon (trade mark) 7F-J, a product of Mitsui-DuPont Fluoro-chemical Co., Ltd.; specific gravity 2.16

WC-I: a product of EUROTUNGSTENE Co., Ltd.; Vickers hardness 1,690HV, specific gravity 14.8, and average particle size 0.9 μm WC-II: a product of ditto company; Vickers hardness 1,410HV, specific gravity 14.56, and average particle size 2.0 μm WC-III: a product of ditto company; Vickers hardness 1,280HV, specific gravity 14.62, average particle size 4.0 μm SiC: a product of H. C. Stack Co., Ltd.; Vickers hardness 2,400HV, specific gravity 1.7, and average particle size 0.7 μm TiC: a product of Nippon Shin-Kinzoku Co., Ltd.; Vickers hardness 2,800HV, specific gravity 4.93, and average particle size 1.9 μm

TABLE 1

| Ex. No. | WC-I | WC-II | WC-III | SiC | TiC | Specific abrasion amount (×10$^{-6}$ mm$^3$/N · mm) |
|---|---|---|---|---|---|---|
| 1 | 1 | | | | | 8.65 |
| 2 | 3 | | | | | 5.74 |
| 3 | 5 | | | | | 6.15 |
| 4 | 10 | | | | | 10.5 |
| 5 | | 1 | | | | 4.90 |
| 6 | | 3 | | | | 3.39 |
| 7 | | 5 | | | | 3.09 |
| 8 | | 10 | | | | 2.25 |
| 9 | | | 1 | | | 2.45 |
| 10 | | | 3 | | | 3.17 |
| 11 | | | 5 | | | 2.55 |
| 12 | | | 10 | | | 1.59 |
| 13 | | | | 1 | | 11.4 |
| 14 | | | | 3 | | 10.1 |
| 15 | | | | 5 | | 8.70 |
| 16 | | | | 10 | | 6.59 |
| 17 | | | | | 1 | 3.45 |
| 18 | | | | | 3 | 2.77 |
| 19 | | | | | 5 | 2.05 |
| 20 | | | | | 10 | 1.70 |

It can be concluded from the foregoing results that:
(1) In the case of WC such tendencies can be observed as the specific abrasion amount will be lowered with increasing average particle size; the specific abrasion amount can be a minimum for an average particle size of 0.9 μm in a filling amount of 3% by volume; and the specific abrasion amount will be smaller for both average particle sizes of 2.0 μm and 4.0 μm with increasing a filling amounts and can reach a minimum for both of the average particle sizes in the filling amount of 10% by volume, respectively;

(2) In the case of a WC filling amount of 10% by volume, WC with an average particle size of 4.0 μm has a specific abrasion amount nearly 1/6.6 times as small as that with an average particle size of 0.9 μm;
(3) In the case of SiC, such a tendency can be observed as the specific abrasion amount will be lowered with increasing a filling amount of SiC and
(4) In the case of TiC with an average particle size of 2.0 μm, such a tendency can be observed as the specific abrasion amount will be lowered with increasing a filling amount and reaches a minimum in the filling amount of 10% by volume.

Example 21

A PTFE resin composition comprising 74% by volume of afore-mentioned PTFE resin, 9% by volume of the afore-mentioned WC-I, and 17% by volume of carbon fibers (a product of Kureha Chemical Industry Co., Ltd.; average fiber diameter 12 μm; average fiber length 120 μm; and specific gravity 1.60) as constituent components for a test piece was used, and the test piece made therefrom was subjected to the same reciprocating motion friction abrasion test. It was found the specific abrasion amount was $6.18 \times 10^{-6}$ mm$^3$/N·mm, and was lowered to nearly half thereof with the filling of carbon fibers, ever in the case of the same degree of the filling proportion of WC.

Examples 22-35

In Example 21, the PTFE resin compositions having predetermined proportion of various species of WC, and the carbon fibers were used, and the test pieces made therefrom were subjected to determination of self-abrasion property (reduction in weight by abrasion). Results of determination are shown in the following Table 2 in terms of specific abrasion amounts, together with amounts in % by volume of constituent components for test pieces (the balance being PTFE resin in % by volume).

TABLE 2

| Ex. No. | WC-I | WC-II | WC-III | Carbon fibers | Specific abrasion amount ($\times 10^{-6}$ mm$^3$/N · mm) |
|---|---|---|---|---|---|
| 22 | 1 | | | 10.5 | 6.70 |
| 23 | 10 | | | 1 | 4.53 |
| 24 | 1 | | | 20 | 5.22 |
| 25 | 10 | | | 20 | 4.52 |
| 26 | 5 | | | 10 | 4.37 |
| 27 | | 5.5 | | 10.5 | 3.76 |
| 28 | | 1 | | 20 | 3.43 |
| 29 | | 5.5 | | 20 | 2.05 |
| 30 | | | 1 | 10.5 | 3.35 |
| 31 | | | 5.5 | 20 | 2.87 |
| 32 | | | 10 | 20 | 1.56 |
| 33 | | | 10 | 10.5 | 1.45 |
| 34 | | 5 | | 20 | 1.9 |
| 35 | | | 5 | 10 | 2.07 |

It can be concluded from the foregoing results that:
(1) The higher the filling amount of carbon fibers, the lower the specific abrasion amount, and
(2) When the carbon fibers were kept constant in the same filling amount, the specific abrasion amount will be lowered with increasing filling amounts of WC.

Examples 36-44

PTFE resin compositions comprising predetermined proportions of the afore-mentioned PTFE resin, glass fibers or the afore-mentioned carbon fibers, and various species of coke powder were used together with 0.6% by volume of the afore-mentioned TiC powder, and the test pieces made therefrom were subjected to determination self-abrasion property (reduction in weight by abrasion). Results of determination were given in the following Table 3 in terms of specific abrasion amount together with amounts in % by volume of test piece constituent components (the balance being the amount of % by volume of TiC powder).

Glass fibers: a product of Fukushima Ceramics Co., Ltd.; average fiber diameter 10 μm, average fiber length 50 μm, and specific gravity 2.54

Coke powder I: a product of Oriental Sangyo Co., Ltd.; average particle size 6.0 μm, and specific gravity 2.0

Coke powder II: a product of Chuetsu Graphite Co., Ltd.; average particle size 60 μm, and specific gravity 2.0

Coke powder III: a product of ditto company; average particle size 30 μm, and specific gravity 2.0

TABLE 3

| Ex. No. | PTFE | Glass fibers | Carbon fibers | Coke powder I | Coke powder II | Coke powder III | Specific abrasion amount ($\times 10^{-6}$ mm$^3$/N · mm) |
|---|---|---|---|---|---|---|---|
| 36 | 91.1 | 4.3 | | 4.0 | | | 2.90 |
| 37 | 73.1 | 22.2 | | 4.1 | | | 2.98 |
| 38 | 75.0 | 4.3 | | 20.1 | | | 3.46 |
| 39 | 76.0 | 3.0 | | | 20.4 | | 4.57 |
| 40 | 76.3 | 18.1 | | | 5.0 | | 3.84 |
| 41 | 91.1 | 4.3 | | | | 4.0 | 5.98 |
| 42 | 73.1 | 22.2 | | | | 4.1 | 3.31 |
| 43 | 75.0 | 4.3 | | | | 20.1 | 5.88 |
| 44 | 76.1 | | 3.1 | | 20.2 | | 4.39 |

It can be concluded from the foregoing results that the similar specific abrasion amounts with the cases of using carbon fibers were also obtained even in the cases of using glass fibers.

In Examples 36 and 37, compression creeps were determined as creep characteristics (according to old ASTM D621; P:13.7 MPa, duration: 24 hours, and test temperature θ: 25° C.), and results as shown in the following Table 4 were obtained:

TABLE 4

| Ex. No. | Total strain (%) | Permanent strain (%) |
|---|---|---|
| 36 | 11.9 | 6.1 |
| 37 | 7.3 | 3.2 |

Comparative Example 1

In Example 1, a PTFE resin composition comprising 74% by volume of PTFE resin (Teflon (trade mark) 7F-J), 9% by volume of bronze powder (average particle size 50 μm), and 17% by volume of carbon fibers (the afore-mentioned product of Kureha Chemical Industry Co., Ltd.) was used. Specific abrasion amount was found to be $8.49 \times 10^{-6}$ mm$^3$/N·mm.

Comparative Example 2

In Example 1, a PTFE resin composition comprising 87% by volume of PTFE resin (Teflon (trade mark) 7F-J) and 13% by volume of the afore-mentioned carbon fibers was used. Specific abrasion amount was found to be $8.94 \times 10^{-6}$ mm$^3$$^1$N·mm.

Comparative Example 3

In Example 1, a PTFE resin composition comprising 68% by volume of PTFE resin (Teflon (trade mark) 7F-J) and 32% by volume of coal coke powder (average particle size 50 μm) was used. Specific abrasion amount was found to be $11.9 \times 10^{-6}$ mm$^3$/N·mm.

Example 45

In Example 34, ring-shaped test pieces having a square cross-section (thickness in radial direction 2.6 mm, and height in axial direction 2.6 mm) were prepared in place of the rectangular parallelepiped test pieces.

Comparative Example 4

A PTFE resin composition comprising 67.5% by volume of PTFE resin (Teflon (trade mark) 7F-J), 6.5% by volume of the afore-mentioned carbon fibers, and 26% by volume of oil coke powder (a product of Chuetsu Gaphite Co., Ltd.; average particle size 30 μm) was used. Test pieces of the same dimensions and shape as in Example 45 were prepared.

Comparative Example 5

A PTFE resin composition comprising 65% by volume of PTFE resin and 35% by volume of coal coke powder (average particle size 45 μm, where a very small amount of graphite is contained). Ring-shaped test pieces having a square cross-section (thickness in radial direction 3.0 mm, and height in axial direction 2.6 mm) were prepared.

Test pieces of the foregoing Example 45 and Comparative Examples 4 and 5 were subjected to reciprocating motion durability tests in an actual housing under the following conditions to determine a seal ring abrasion amount, a sliding resistance of seal ring (single piece) at test, and an abrasion amount of housing:

Housing: SCM420H (sintered), without 1.6a polishing
Oil pressure: 5.7MPa
Temperature: 120° C.
Speed: 4mm/sec. (±6 mm)
Oil species: NS-2

The results are shown in the following Table 5. Seal ring abrasion amount ΔT (given by a difference H-h between thickness H before the sliding and thickness h after the sliding of a seal ring in a shape of square cross-section with a height D in axial direction), and housing abrasion amount were determined each for the same two test pieces A and B.

TABLE 5

| Duration (hr) | Example 45 A | Example 45 B | Comp. Ex. 4 A | Comp. Ex. 4 B | Comp. Ex. 5 A | Comp. Ex. 5 B |
|---|---|---|---|---|---|---|
| [seal ring abrasion amount ΔT(mm)] | | | | | | |
| 1 | 0.00 | 0.00 | 0.00 | 0.00 | 0.00 | 0.00 |
| 3 | 0.00 | 0.00 | 0.03 | 0.03 | 0.02 | 0.01 |
| 10 | 0.00 | 0.00 | 0.05 | 0.06 | 0.02 | 0.03 |
| 30 | 0.00 | 0.00 | 0.10 | 0.08 | 0.03 | 0.03 |
| 50 | 0.00 | 0.00 | 0.15 | 0.13 | 0.03 | 0.04 |
| 100 | 0.01 | 0.00 | 0.24 | 0.23 | 0.04 | 0.05 |
| 130 | | | 0.28 | 0.26 | | |
| 192 | | | | | 0.06 | 0.07 |
| 200 | 0.01 | 0.00 | | | | |
| 242 | | | | | 0.08 | 0.08 |
| 243 | 0.01 | 0.01 | | | | |
| 342 | | | | | 0.08 | 0.09 |
| 385 | | | | | 0.09 | 0.10 |
| [Seal ring (single piece) sliding resistance (N) at test] | | | | | | |
| 1 | 262.1 | | 274.8 | | 391.9 | |
| 3 | 267.2 | | 384.2 | | 399.4 | |
| 10 | 294.6 | | 396.9 | | 366.4 | |
| 30 | 279.1 | | 484.4 | | 385.4 | |
| 50 | 299.8 | | 533.9 | | 414.4 | |
| 100 | 284.3 | | 462.5 | | 431.5 | |
| 130 | | | 436.7 | | 490.9 | |
| 200 | 276.5 | | | | | |
| 243 | 320.4 | | | | 493.6 | |
| [Housing abrasion amount (μm)] | | | | | | |
| 1 | 0.0 | 0.0 | 0.0 | 0.0 | 0.0 | 0.0 |
| 3 | 0.5 | 0.6 | 0.0 | 0.0 | 0.2 | 0.1 |
| 10 | 1.0 | 1.1 | 0.1 | 0.0 | 0.3 | 0.2 |
| 30 | 1.2 | 1.3 | 0.1 | 0.0 | 0.3 | 0.2 |
| 50 | 1.2 | 1.3 | 0.1 | 0.0 | 0.3 | 0.3 |
| 100 | 1.2 | 1.4 | 0.1 | 0.1 | 0.3 | 0.3 |
| 130 | 1.3 | 1.5 | 0.1 | 0.1 | | |
| 192 | | | | | 0.4 | 0.3 |
| 200 | 1.3 | 1.5 | | | | |
| 242 | | | | | 0.5 | 0.4 |
| 243 | 1.5 | 1.6 | | | | |
| 342 | | | | | 0.5 | 0.4 |
| 385 | | | | | 0.6 | 0.5 |

It can be concluded from the foregoing results that:

(1) Seal ring abrasion amount:

In Example 45, there are no observable changes with time, whereas in Comparative Example 4 rapid abrasion is observable, and in Comparative Example 5 gradual change is observable with time;

(2) Seal ring (single piece) sliding resistance at test:

In Example 45, no substantial changes are observable with time, and the seal rings are kept stable, whereas in Comparative Example 4 rapid increase in the sliding resistance is observable, and in Comparative Example 5 gradual increase in the sliding resistance is observable;

(3) Housing abrasion amount:

In Example 45, rapid abrasion of mating material within a short time is observable (diagrammatically the gradient rise is so large, in other words, the surface roughness of the mating material can be rapidly smoothened), whereas in Comparative Example 4 no substantial abrasion is observable, and in Comparative Example 5 gradual abrasion is observable, but no flattening of the surface roughness of the mating material is attained; and (4) Materials of Example 45 is distinguished as practical sliding materials capable of reducing self-abrasion and rapidly polishing the mating material.

The invention claimed is:

1. A PTFE resin composition for use as a molding material of a seal ring against a metal having a rough surface to be polished as a mating material which consists of polytetrafluoroethylene (PTFE) resin molding powder consisting of at least one of tetrafluoroethylene homopolymer, tetrafluoroethylene copolymer having fluoroalkyl group on a side chain and tetrafluoroethylene-ethylene copolymer, tungsten carbide (WC) having a Vickers hardness of 1,200HV or more, and an inorganic fibrous filler, wherein the tungsten carbide imparts a polishing function to the PTFE resin so that when used as a molding material of a seal ring against a metal having a rough surface, the PTFE resin polishes that rough surface.

2. A PTFE resin composition according to claim 1, wherein the tungsten carbide is contained in a proportion of 0.5-30% by volume on the basis of sum total of PTFE resin and tungsten carbide.

3. A PTFE resin composition according to claim 1, wherein the inorganic fibrous filler is carbon fibers or glass fibers.

4. A PTFE resin composition according to claim 1, wherein the inorganic fibrous filler is contained in a proportion of 30% by volume or less on the basis of sum total of PTFE resin, tungsten carbide and inorganic fibrous filler.

5. A PTFE resin composition according to claim 1, wherein the tungsten carbide is contained in a proportion of 0.5-10% by volume on the basis of sum total of the PTFE resin, tungsten carbide and inorganic fibrous filler.

* * * * *